UNITED STATES PATENT OFFICE.

ERICH LANGHELD, OF STEGLITZ, GERMANY.

QUININ DERIVATIVE AND PROCESS OF MAKING SAME.

SPECIFICATION forming part of Letters Patent No. 605,491, dated June 14, 1898.

Application filed October 19, 1896. Serial No. 609,263. (Specimens.)

*To all whom it may concern:*

Be it known that I, ERICH LANGHELD, a subject of the German Emperor, and a resident of Steglitz, near Berlin, Germany, have invented certain new and useful Improvements in the Manufacture of a New Derivate of Quinin, of which the following is a specification.

This invention relates to the manufacture of a new derivate of quinin.

The invention consists, first, in the method of producing new derivates of quinin hereinafter described and claimed; second, in the new product produced by such method.

The method is as follows: Quinin is dissolved in water, alcohol, or a mixture of alcohol and water to produce a quinin solution, and ozonized gas, obtained in any known or suitable manner, is introduced until no precipitate will be produced by an alkali, as caustic soda. This solution contains the new substance. The solvent is then evaporated in a vacuum, and the new derivate is obtained in solid form. The formula of the new compound is $C_{19}H_{20}N_2O_5$. This substance has an acid reaction. It will separate iodin from solution of iodin of potassium and starch. Boiling down said solution in a vacuum produces an amorphous powder of yellowish color having acid reaction and which may be decolorized by a solution of permanganate of potassium.

Instead of forming the quinin solution from the free alkaloid it may be produced from quinin salts. For example, dissolve one part of quinin hydrochlorid in three parts of alcohol and thirty-four parts of water, then treat with ozone until precipitation will not be produced by the alkali, as above stated, and then evaporate. The product in this case is the hydrochlorid salt of the derivate produced from the alkaloid quinin. When other salt of quinin than the hydrochlorid is used, a corresponding salt of the new derivate will be produced.

I am aware that it has been proposed to produce a certain compound of quinin by oxidation by means of potassium permanganate. This product ($C_{19}H_{22}N_2O_4$) is insoluble in ether and difficult to dissolve in water. On the other hand, my new composition is readily soluble in ether and in water, as above stated.

The new derivates described are very soluble in water, alcohol, ether, benzene, &c. The melting-point of the hydrochloric salt is 127° centigrade. Said derivates are useful for medicinal purposes, a dose being from ten to fifty grains in fifty or more grains of distilled water.

I claim—

1. The method of manufacturing derivates of quinin which consists in making a quinin solution and treating said solution with ozonized gas until precipitation will not be caused by an alkali.

2. The method of manufacturing derivates of quinin which consists in making a solution of quinin hydrochlorid in a mixture of water and alcohol and treating it with ozonized gas until precipitation will not be caused by an alkali.

3. The new derivate of quinin being an amorphous powder of yellowish color, very soluble in water, alcohol, ether, and benzene, having an acid reaction, and with the chemical formula $C_{19}H_{20}N_2O_5$.

Signed at Berlin this 7th day of October, 1896.

ERICH LANGHELD.

Witnesses:
 JOHN B. JACKSON,
 MAX WAGNER.